United States Patent [19]
Donovan

[11] 3,983,400
[45] Sept. 28, 1976

[54] ROTATING CASSETTE HOLDER

[75] Inventor: William F. Donovan, Aberdeen, Md.

[73] Assignee: The United States of America as represented by the Secretary of the Army, Washington, D.C.

[22] Filed: May 8, 1975

[21] Appl. No.: 575,856

[52] U.S. Cl. ............................................. 250/468
[51] Int. Cl.² ....................................... G03B 41/16
[58] Field of Search .......... 250/439, 444, 445, 451, 250/456, 468, 470, 471, 475

[56] References Cited
UNITED STATES PATENTS 3,297,871  1/1967  Nathanson ........................ 250/444
3,795,815  3/1974  Weinstock ........................ 250/444

Primary Examiner—Craig E. Church
Attorney, Agent, or Firm—Nathan Edelberg; Robert P. Gibson; Saul Elbaum

[57] ABSTRACT

An X-ray cassette film holder is provided adjacent the axis of a projectile flight, where it is subject to blast forces. Means are provided for pivotally mounting the cassette holder in an eccentric manner so that blast forces cause a rotation of the holder mass in an aerodynamic environment to expend impressed energy.

9 Claims, 5 Drawing Figures

Axis of Projectile

ROTATING CASSETTE HOLDER

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to film holders, and more particularly to an X-ray film cassette holder utilized in an X-ray photography application.

BRIEF DESCRIPTION OF THE PRIOR ART

The various techniques of X-ray photography are widely known and commonly applied wherever there are obvious impediments to obtaining visible ray images for scientific or industrial purposes. In the particular field of ballistics, applications include the study of the motion of the projectile both within the barrel and in the region of the muzzle blast. The in-bore work is usually concerned with interior ballistics trajectories while the muzzle blast investigations look at projectile attitude (yaw), possible mechanical damage, and sabot separation mechanics. In both cases, an X-ray head projects a beam across a path which includes the object (projectile) onto a screen which carries a sensitized sheet of film. The film is exposed everywhere except where the opaque object blocks the passage of the X-rays. The result is essentially a shadowgraph.

For the muzzle blast region work, the screen (or cassette) is carried in a cassette holder and the assembly is positioned adjacent to the line of fire. Since the X-rays have a comparatively short range of action, this usually places the cassette holder assembly within the environment of the fireball and exposes it to severe aerodynamic forces for a short interval of time. These forces are not critical for small bore weapons but for cannon and for heavy artillery the ancillary construction required to restrain the cassette holder in fixed position is prohibitive. There is also the possibility that reflected waves from the cassette system could affect the pressure distribution at the base of the projectile and invalidate the aerodynamic measurements. Current practice usually employs untethered cassette holders which are carried off by the strong blast and must be manually recovered and remounted. An immobile mount is not mandatory since the picture is obtained as the supersonic velocity projectile passes the screen — with the strong blast wave following a finite time later. Tethered arrangements have the disadvantage in that they entail dangers from possible flailing of the equipment and that the tether is subject to the blast and the fireball. An alternative prior art approach uses a cassette mounted inside a 55 gal. drum — which is allowed to roll off and is then retreived. In all of these systems, the transposed energy is dissipated in accordance with Newton's law:

Free flight resisting force on cassette holder = Mass moved × translational deceleration experienced. The other aerodynamic forces that affect the motion, such as lift, static movement, and the magnus and damping moments, are not of major order of influence in slowing the cassette holder. It should be noted that the impulse $\delta \, F \, dt$ impressed on the mass has a very large F and a very small $\delta \, dt$ but that $F = f(t)$ and the precise closed form analytical solution of the equations of motion is not available.

BRIEF DESCRIPTION OF THE PRESENT INVENTION

The present invention employs a rotating cassette holder which is so designed that the aerodynamic force is deliberately unbalanced to produce a torque, a rotation and a consequent dissipation of energy by exposing the projected area to residual blast flow and subsequent (counter torque braking. Newton's law for this behavior corresponds to:

Unbalanced force × distance to centroid of exposed area = Torsional moment of inertia × torsional acceleration.

Although the initial total impulse must be the same in the comparable systems, for the rotating cassette a counter impulse is delivered as the reverse side of the cassette holder is presented to the expanding blast which alternately and progressively depletes the angular momentum of the spinning mass.

This invention, therefore, permits the acquisition of ballistic X-ray photographs by simple and direct methods heretofore unemployed. Economies result from the conservation of manpower and the extended life of the equipment.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
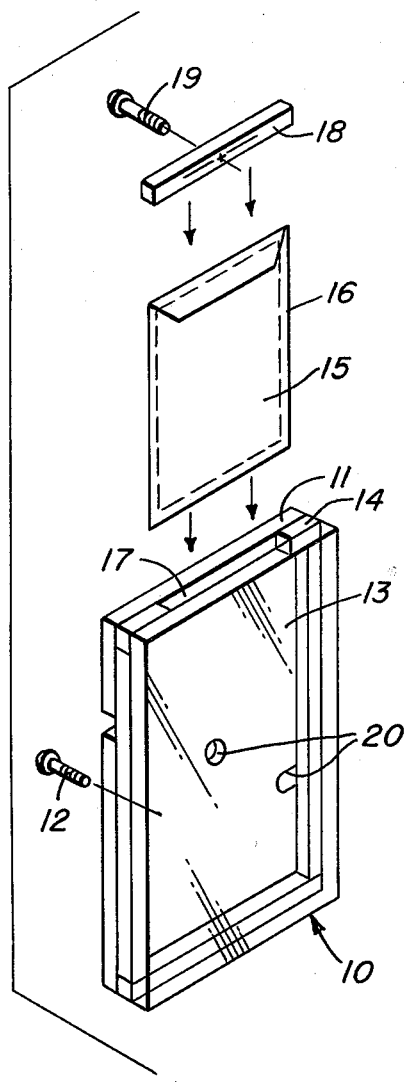
FIG. 1 is a disassembled view of a cassette film holder as used in the present invention.
Figure 4:
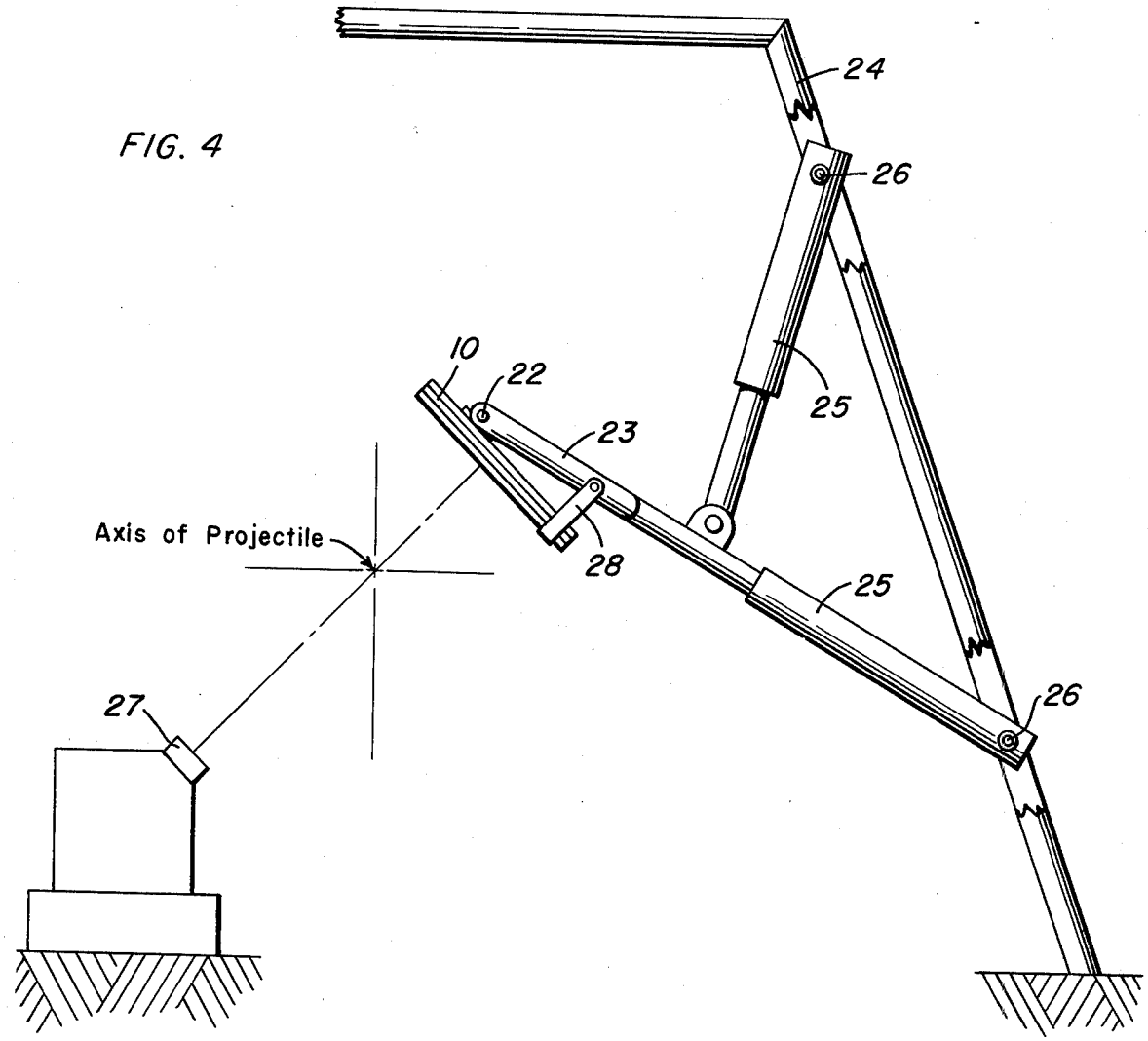
FIG. 4 is an elevational view illustrating the relative disposition of the cassette holder of the present invention relative to an X-ray source.

With reference to the figures, and more particularly FIG. 1, the cassette holder 10 consists of a rigid back plate 11 of material, such as ¼ inch aluminum with sufficient strength to survive the blast and fireball, to which is affixed by means of through bolts 12 or equivalent fasteners, an X-ray transparent window 13, which can be made from ⅜ inch LEXAN. The window is separated from the back plate 11 by an edge spacer strip 14, so that a thin sheet of sensitized photographic film 15 which is suitably protected from ambient light, typically by means of commercial envelope construction 16, can be inserted and positioned to receive the projectile image from the X-ray source 27 (FIG. 4). The resulting opening 17 receives the film packet and is later closed by gasket strip 18 to protect the interior cavity from gun gas and atmospheric degradation. Through bolts 19 lock the gasket strip into position. Finger holes 20 are located in the back plate to manipulate the X-ray packet and to assist in withdrawing the packet after firing. Another purpose of the finger holes is to relieve any pressure that might be trapped within the cassette holder.

Figure 2:
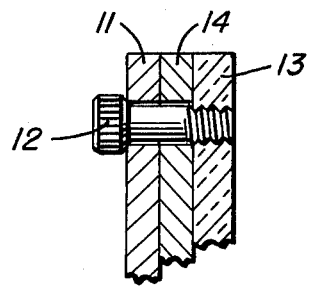
FIG. 2 is a partial sectional view of the components shown in FIG. 1, showing the various components assembled.

FIG. 2 is a cross section showing certain of the above-discussed parts in assembly.

Figure 3:
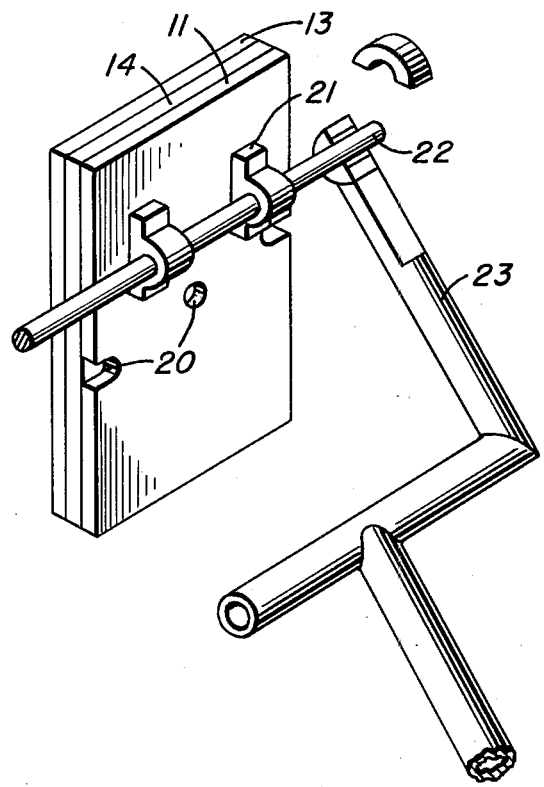
FIG. 3 is a perspective view illustrating the mounting of the cassette holder, of the present invention, on a supporting frame.

In FIG. 3, a back view, there are shown two pillow blocks 21 or bearings attached to the cassette holder on the back plate 11 that are located eccentrically so that an unbalanced force is produced by the distributed pressure over the front facing window 13. The pillow blocks 21 contain an axle 22 which extends beyond the lateral edges of the cassette holder with the axle anchored in the frame fork 23.

In FIG. 4, an elevation, frame fork 23 is connected to the rigid truss 24. The cassette holder 10 is mounted to rotate without interference about the axle 22. The frame fork 23 is connected to truss 24 by telescoping struts 25 that are disposed at angular relationship to one another. As shown in the figure, the upper telescoping strut is pivotally mounted to the frame fork 23, while the lower strut may be integrally or directly connected to the lower end of frame fork 23. Opposite ends of the struts 25 are pivotally connected to respective points 26, on the truss 24. Locking mechanisms, such as simple thumb screws, may be employed to lock the adjusted telescoping struts in preselected positions. By adjusting the telescoping struts 25, there are allowed elevation and extension of the cassette holder with respect to the positioning of the X-ray source 27 and the line of fire, or axis of a projectile. A spring loaded rachet 28 orients the cassette holder approximately prependicular to the direction of the X-rays.

Figure 5:
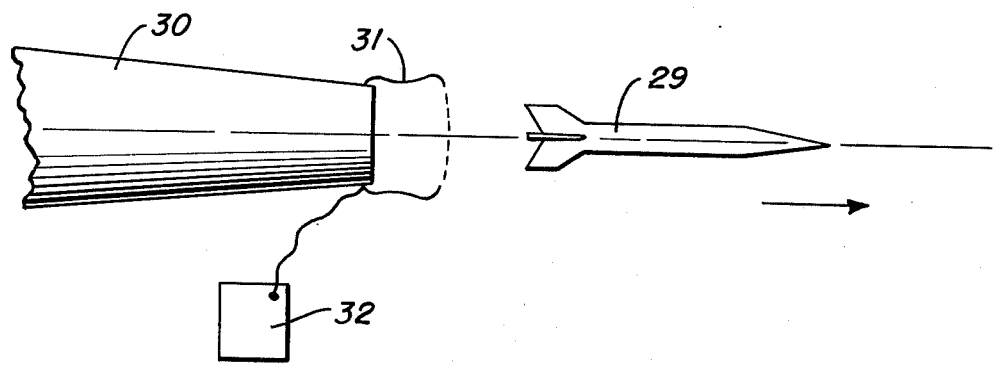
FIG. 5 is an elevational view illustrating a projectile leaving a weapon muzzle.

FIG. 5 shows the projectile 29 leaving the muzzle of the gun 30 after breaking trip wire 31 which actuates an electronic delay timer 32 which triggers the X-ray transmission precisely as the projectile passes between the screen and the X-ray source. This technique is conventional.

Following the passage of the supersonic projectile, the blast wave expands to provide a contact pressure front with the face of cassette holder 10. Since the cassette holder is mounted eccentrically about the axle 22, the motion produced is rotation. As the cassette holder completes each 180° turn, the reverse side is presented to the residual force of the blast and the angular velocity decreases. Although later reinforcement of the rotation also occurs, the magnitude is progressively reduced and eventually the cycling ceases.

The film cassette 15, 16 can then be withdrawn after removing bolt 19. The film can then be processed by conventional techniques.

According to the above disclosure, it will be appreciated that the present invention utilizes the rotation of mass in an aerodynamic environment to expend impressed energy and thereby permits the acquisition of X-ray photographs with convenience and economy. Direct advantags, in comparison with other procedures, accrue from the fact that no loose pieces are permitted to become unguided missiles. Also, the cassette is not subject to buffeting contact with any hard objects (ground or adjacent structures). Indirect advantages result from the ease of handling built into the sytstem. Personal lift only the light weight film packet, not the entire cassette holder; and there is no time or effort expended in retrieving the cassette.

Although the present invention has been illustratively described in terms of X-ray photography, this invention is not so restricted, practically. For instance, infrared photos in the blast region may be obtained. Also, with appropriate commutation, or radio signaling, pressure sensors over a discrete area may be installed and the local blast strengths measured. Indeed, the rotating cassette holder may be mechanically coupled to a power sink (an electrical generator, for instance) to provide a measurement of the gas energy at the gun muzzle.

Various other engineering adaptations may also be of some advantage. Shock absorbers are feasible, as well as friction devices and water brakes, to apply to the structure of the various members for the purpose of absorbing energy.

It should be understood that the invention is not limited to the exact details of construction shown and described herein for obvious modifications will occur to persons skilled in the art.

I claim as my invention:

1. An X-ray film holder to be used in the vicinity of a projectile blast for holding film in opposite spaced relation to an X-ray source, the line of sight between the X-ray source and film intersecting a projectile path, the holder comprising:
    means for receiving X-ray film therein;
    a structural support;
    means for mounting the film receiving means to said structural support for rotation about an axis;
    means interconnecting the receiving means and the structural support for holding the receiving means in a particular orientation with respect to said X-ray source and for releasing the receiving means for spinning about said axis when subjected to projectile blast forces;
    said rotatable mounting means being eccentrically mounted with respect to the centroid of the receiving means so that the receiving means responds aerodynamically to blast forces by spinning in an energy dissipating manner thereby minimizing the interval during which said spinning occurs.

2. The subject matter of claim 1 wherein the receiving means includes a face plate fabricated from an X-ray transparent material.

3. The subject matter of claim 2 wherein said structural support comprises a fork frame, and said axis entends between the tines of said fork frame, an opposite end portion of said fork frame being adjustably, angularly mounted to a truss which is stationarily positioned.

4. The subject matter of claim 3 wherein telescoping strut members are connected between the fork frame and the truss to enable desired angular orientation of the receiving means with respect to an X-ray source.

5. The subject matter of claim 4 wherein the receiving means includes gas seal means disposed between the face plate of the receiving means and the edges thereof.

6. The subject matter of claim 5 wherein a back plate is fastened in spaced parallel relationship to the face plate, said back plate including holes formed therein to permit escape of trapped gas from the interior of the receiving means as well as to permit positioning of film enclosed within.

7. An X-ray apparatus to be used in the vicinity of a projectile blast, comprising:
    means for receiving X-ray film therein including a face plate fabricated from an X-ray transparent material, gas seal means disposed between the face plate of the receiving means and the edges thereof, and a back plate fastened in spaced parallel relationship to the face plate, said back plate including holes formed therein to permit escape of trapped gas from the interior of the receiving means as well as to permit positioning of film enclosed within;

an X-ray source disposed in opposite spaced relationship to said film receiving means, the line of sight between said X-ray source and said film receiving means intersecting a projectile path;

a structural support comprising a fork frame pivotally connected at a first end thereof to the receiving means, an opposite end portion being adjustably, angularly mounted to a truss which is stationarily positioned, and telescoping strut members connected between the fork frame and the truss to enable desired angular orientation of the receiving means with respect to said X-ray source;

means for pivotally mounting the film receiving means to said structural support; and means interconnecting the receiving means and the structural support for orienting the receiving means in a particular direction, with respect to said X-ray source;

the pivotal means being eccentrically mounted with respect to the centroid of the receiving means so that the receiving means responds aerodynamically to blast forces by rotating in an energy dissipating manner thereby minimizing the interval during which said rotation occurs.

8. The subject matter of claim 7 together with a ballistics weapon having a trip wire connected across the muzzle thereof, and switching means connected between the trip wire and the X-ray source for energizing the X-ray source upon the passage of a projectile through the trip wire.

9. The subject matter of claim 8 together with means for locking the telescoping struts in preselected positions.

* * * * *